(12) United States Patent
Togino

(10) Patent No.: US 6,963,224 B2
(45) Date of Patent: Nov. 8, 2005

(54) REFLEXIVE OPTICAL SCREEN, AND VIEWING SYSTEM INCORPORATING THE SAME

(75) Inventor: Takayoshi Togino, Koganei (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/913,466

(22) Filed: Aug. 9, 2004

(65) Prior Publication Data

US 2005/0030618 A1 Feb. 10, 2005

(30) Foreign Application Priority Data

Aug. 8, 2003 (JP) ........................................ 2003-289906

(51) Int. Cl.[7] .......................... H03K 19/177; G02B 6/26
(52) U.S. Cl. ............................ 326/41; 326/40; 385/47; 385/33; 385/84; 385/141; 385/88
(58) Field of Search ...................... 326/40, 41; 385/47, 385/33, 84, 141, 115, 88, 137

(56) References Cited

U.S. PATENT DOCUMENTS

| | | | |
|---|---|---|---|
| 5,960,109 A | * | 9/1999 | Shiau .......................... 382/164 |
| 6,350,032 B1 | * | 2/2002 | Menozzi et al. ............. 351/239 |
| 6,775,439 B2 | * | 8/2004 | Takano et al. ................. 385/47 |
| 6,788,874 B1 | * | 9/2004 | Ishikawa et al. ............. 385/141 |
| 6,817,719 B2 | * | 11/2004 | Rudolph et al. .............. 353/37 |
| 6,827,458 B2 | * | 12/2004 | Suga ............................ 362/31 |

FOREIGN PATENT DOCUMENTS

| | | |
|---|---|---|
| JP | 60-064302 | 4/1985 |
| JP | 2000-122176 | 4/2000 |

* cited by examiner

*Primary Examiner*—Michael Tokar
*Assistant Examiner*—Lam T. Mai
(74) *Attorney, Agent, or Firm*—Kenyon & Kenyon

(57) ABSTRACT

The invention relates to a reflexive optical screen that can show bright images with efficiency, and a viewing system that incorporates the same, and provides a reflexive optical screen 10 comprising a plurality of zonal V-grooved reflecting surfaces substantially concentrically located within a given surface and having a retrorelection action. Each of the zonal V-grooved reflecting surfaces comprises mutually orthogonal two conical facets 2 and 3 in a section orthogonal to a ridgeline of a V groove, and the conical facets 2 and 3 of each of the zonal V-grooved reflecting surfaces are located such that a bisector 5 for angles that the two conical facets 2 and 3 make in a section of each of the zonal V-grooved reflecting surfaces is oriented in the direction of a light ray incident on a position thereof.

19 Claims, 16 Drawing Sheets

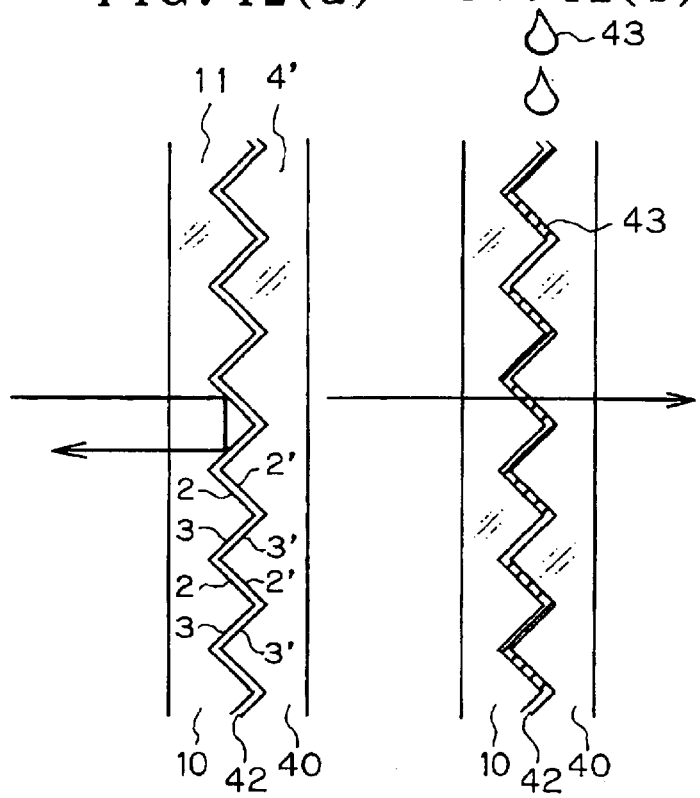
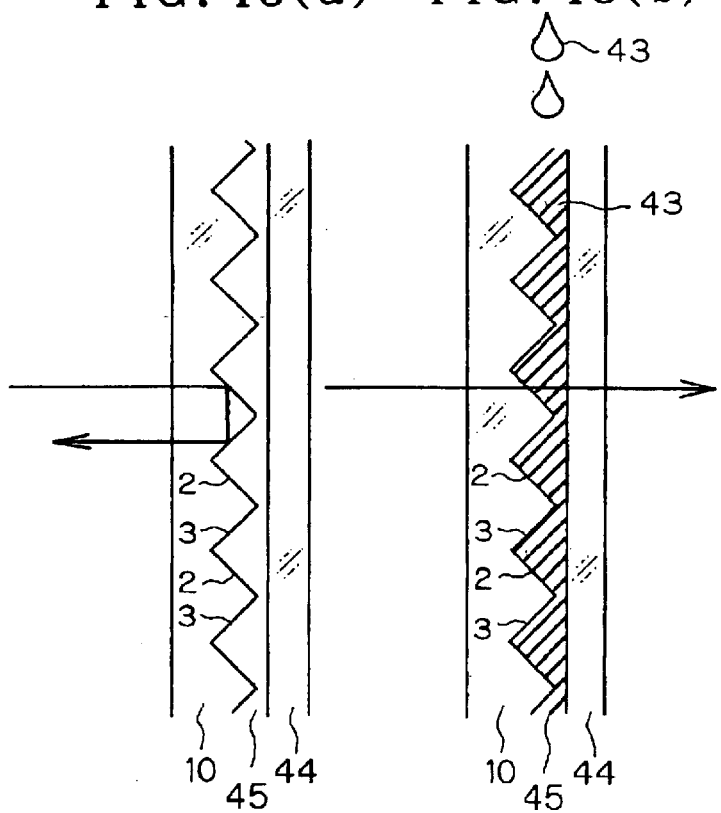

REFLEXIVE OPTICAL SCREEN, AND VIEWING SYSTEM INCORPORATING THE SAME

This application claims benefit of Japanese Patent Application No. 2003-289906 filed in Japan on 8.8, 2003, the contents of which are incorporated by this reference.

BACKGROUND OF THE INVENTION

The present invention relates generally to a reflexive optical screen and a viewing system that incorporates the same, and more particularly to a less dependent-on-angle, high-efficiency bright reflexive optical screen and a viewing system that incorporates the same.

So far, reflexive optical screens and display systems that incorporate them have been proposed as set forth in Patent Publications 1 and 2 or the like.

Patent Publication 1

JP-B 4-11002

Patent Publication 2

JP-A 2000-122176

Reflexive optical screens relying on glass beads are relatively dark because of increased light losses in glass beads and among glass beads. A (angle dependence) problem with a corner cube type arrangement is that upon oblique incidence of light rays, there is no available reflexivity.

SUMMARY OF THE INVENTION

The present invention has for its object the provision of a reflexive optical screen that can show bright images with efficiency and a viewing system that incorporates the same.

Thus, the present invention provides a reflexive optical screen comprising a plurality of zonal V-grooved reflecting surfaces substantially concentrically located within a given surface and having a retrorelection action, characterized in that:

each of said zonal V-grooved reflecting surfaces comprises mutually orthogonal two conical facets in a section orthogonal to the ridgeline of a V groove, and the conical facets of each of said zonal V-grooved reflecting surfaces are located such that a bisector for angles that said two conical facets make in the section of each of said zonal V-grooved reflecting surfaces is oriented in a direction of a light ray incident on a position thereof.

The reflexive optical screen of the invention is also characterized in that each of said zonal V-grooved reflecting surfaces comprises mutually orthogonal two conical facets in a section orthogonal to the ridgeline of a V groove, and the conical facets of each of said zonal V-grooved reflecting surfaces are located such that the angle of entrance on a screen surface of a bisector for an angle that said two conical facets make in said section becomes $\alpha/2$ where $\alpha$ is the angle of incidence of a light ray on each of said zonal V-grooved reflecting surfaces relative to the screen surface.

Further, the present invention encompasses a viewing system comprising an image display device, a projection optical system for magnifying and projecting an image displayed on said image display device, and an optical screen located at or near an image projected through said projection optical system, characterized in that said optical screen comprises either one of the above reflexive optical screens.

All the above arrangements ensure that projection light for projecting images on the screen is subjected to efficient retroreflection at individual positions on the screen, so that bright projected images are viewable.

Still other objects and advantages off the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 12($a$) and 12($b$) are illustrative of the arrangement and advantage of one embodiment of the reflexive optical screen having a switchover function according to the invention.

FIGS. 13($a$) and 13($b$) are illustrative of the arrangement and advantage of another embodiment of the reflexive optical screen having a switchover function according to the invention.

DESCRIPTION OF THE PREFERRED EMBODIMENTS

The present invention provides a reflexive optical screen comprising a plurality of zonal V-grooved reflecting surfaces are substantially concentrically located within a given surface, wherein each zonal V-grooved reflecting surface comprises mutually orthogonal two conical facets in a section orthogonal to the ridgeline of a V-groove.

Figure 1:
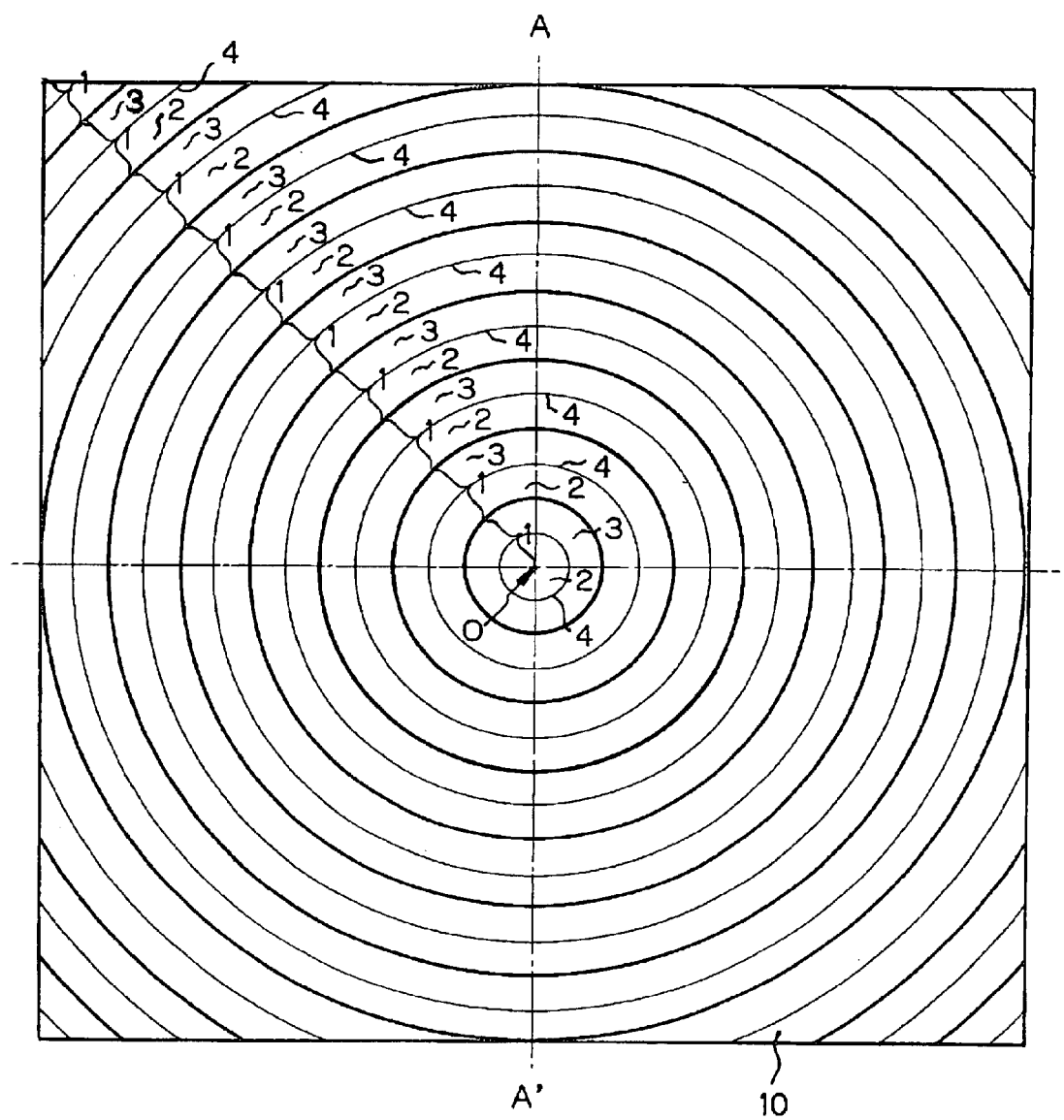
FIG. 1 is a plan view of the reflexive optical screen according to the invention.

In a reflexive optical screen 10 comprising a plurality of such concentric zonal V-grooved reflecting surfaces, a multiplicity of zonal V-grooved reflecting surfaces 1, 1, . . . are located with respect to a center O, as shown in the plan view of FIG. 1. Each zonal V-grooved reflecting surface 1 comprises an inner conical reflecting facet 2 and an outer conical reflecting surface facet, which intersect in such a way as to define a ridgeline 4 that forms a circular bottom valley as viewed from a light-entrance side. In every section orthogonal to this ridgeline 4 (passing through the center O), the inner conical reflecting facet 2 is orthogonal to the outer conical reflecting facet 3.

Figure 2:
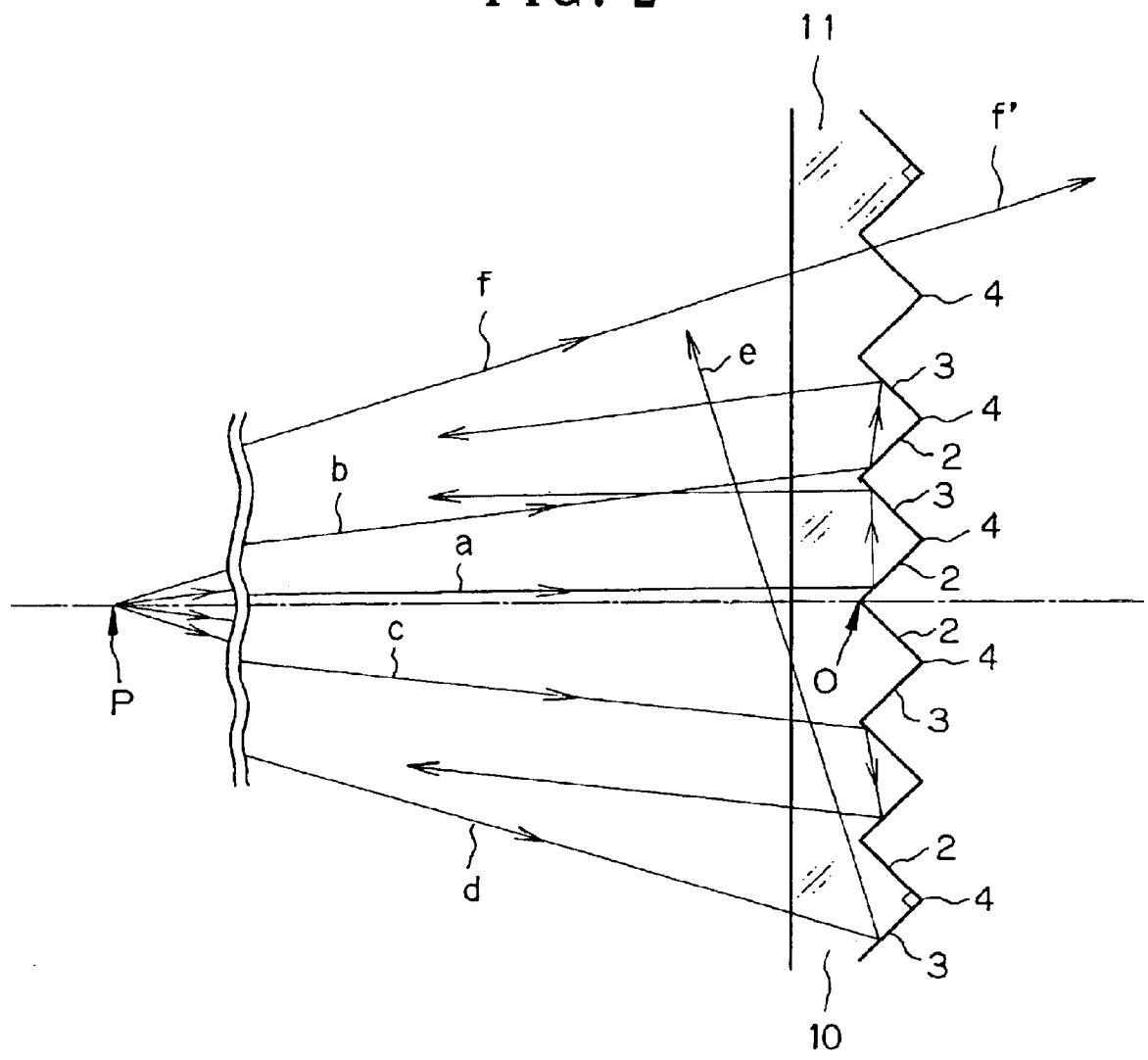
FIG. 2 is a vertical sectional view of FIG. 1, illustrating that what problem arises when the arrangement of the invention is not used.

One exemplary section of such a reflexive optical screen 10 is illustrated in FIG. 2 that is a vertical sectional view taken on line A–A' of FIG. 1, wherein a transparent substrate 11 is used for the reflexive optical screen 10 and conical total-reflection facets 2 and 3 are formed on the back side thereof. In this example, light rays a, b and c, which leave the vicinity of an exit pupil P of a projector on an axis passing through the center O and vertical to a screen surface and enters the vicinity of the center O of the screen 10, go back to the vicinity of the exit pupil P by retroreflection, after reflected twice between the conical reflecting facets 2 and 3. However, some light ray d that is incident on a position a little away from the center O of the screen 10 is reflected at one of the conical reflecting facets 2 and 3, yet it is kept from entering another reflecting facet. As a result, that light ray is reflected as a light ray e in a direction away from the exit pupil P, and so it does not go back to the vicinity of the exit pupil P by retro-reflection. Incident on a position a little away from the center O of the screen 10, some light ray f enters one of the conical reflecting facets 2 and 3 at an angle of incidence that is smaller than the critical angle for the transparent substrate 11, transmitting through the transparent substrate 11 as a light ray f'. In either case, the efficiency of the screen 10 becomes worse; only darks image are viewable.

Figure 3:
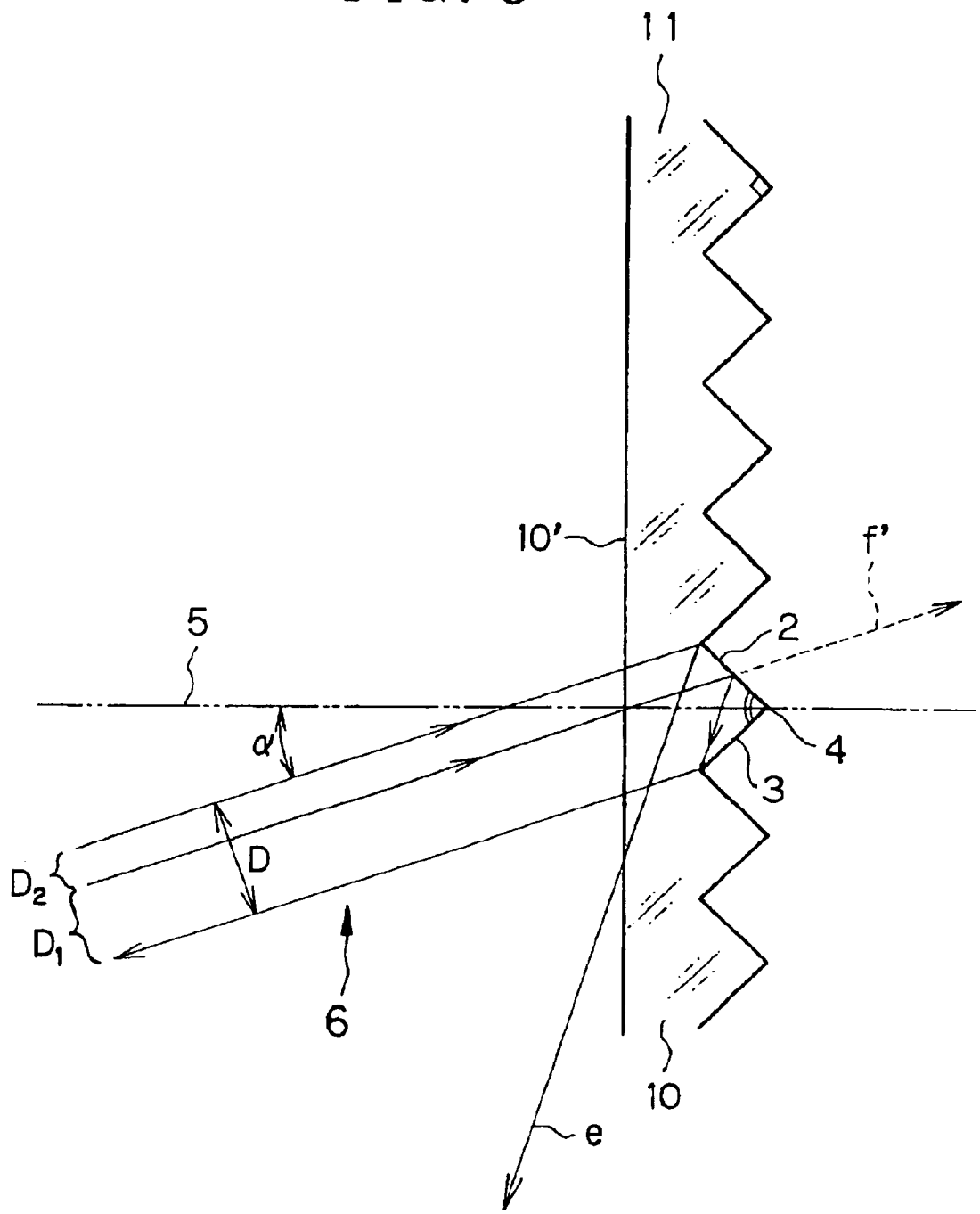
FIG. 3 is further illustrative of another problem.

This is now explained with reference to FIG. 3. Here let α denote an angle of an incoming parallel light beam 6 that makes with respect to a bisector 5 for an angle between the conical reflecting facets 2 and 3 of one zonal V-grooved reflecting surface 1 or a normal to a surface 10' of a screen 10 in a section orthogonal to a ridgeline 4 and D represent a width of the parallel light beam 6 in this section. If the angle α is not zero, there is then a light ray e that is not subjected to retro-reflection, as mentioned above. From simple geometry, it is found that the larger the angle α, the higher the proportion of $D_2$ becomes. Notice here that $D_1$ is a width of a component that is included in the width D of the incoming light beam 6 and subjected to retroreflection and $D_2$ is a width of a component that is not subjected to retroreflection such as the light ray e. If the angle α becomes greater than a certain value, then the light beam enters one of the conical reflecting facets 2 and 3 at an angle of incidence that is smaller than the critical angle for a transparent substrate 11 (the critical angle is $\theta_c = \sin^{-1}(1/n)$ where n is the refractive index of the transparent substrate 11), transmitting through it as transmitted light f' that is little subjected to retroreflection.

Figure 4A:
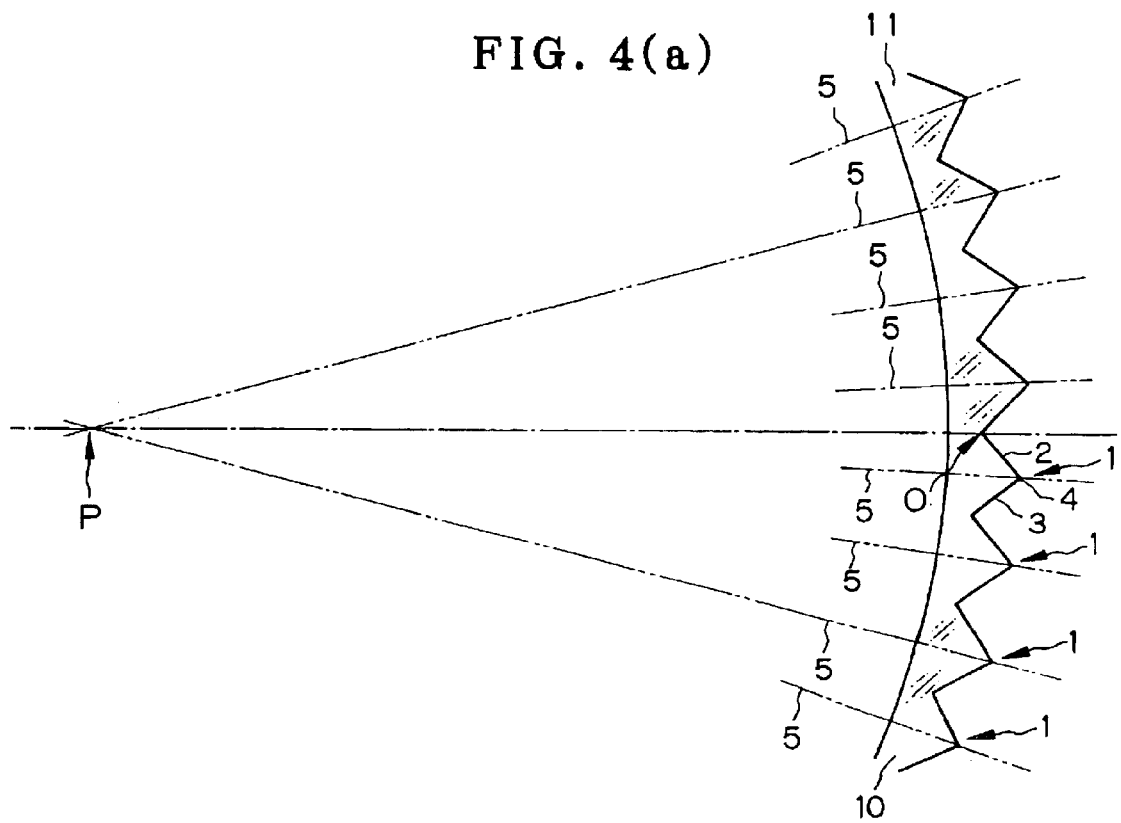
FIGS. 4($a$) and 4($b$) are illustrative of the construction and advantage of the reflexive optical screen according to the first embodiment of the invention.

In the first embodiment of the invention, therefore, a reflexive optical screen 10 is configured in a spherical form with a center given by a point in the vicinity of the exit pupil P of a projector, as shown in FIG. 4(a). Further, zonal V-grooved reflecting surfaces 1, 1, . . . are located concentrically with respect to the center O of the screen 10 such that in a section orthogonal to a ridgeline 4 defined by a set of conical reflecting facets 2 and 3, a bisector 5 for an angle that the set of conical reflecting facets 2 and 3 make is oriented toward the vicinity of the exit pupil P of the projector.

Figure 4B:
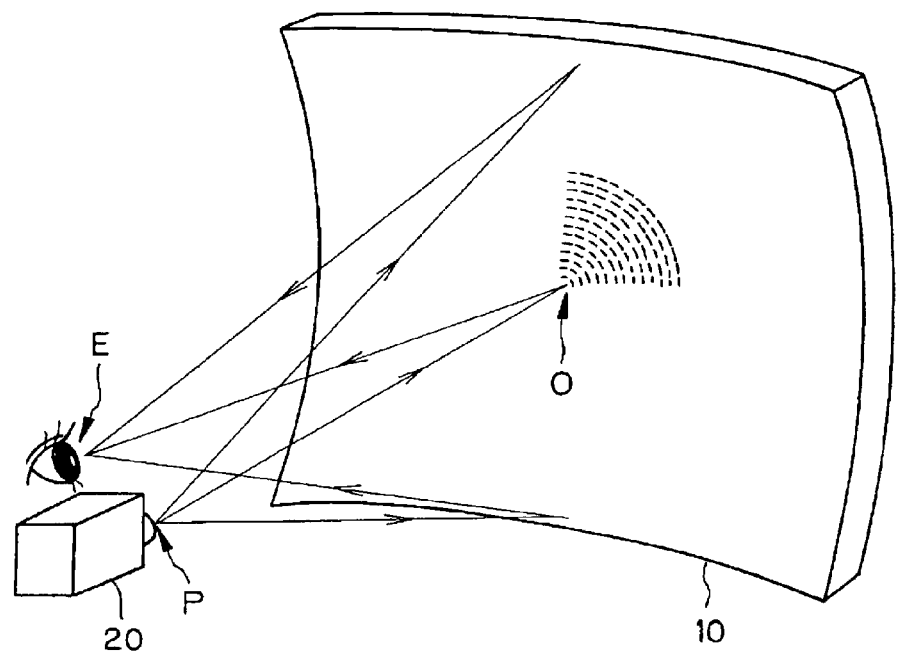

With the reflexive optical screen 10 set up as described above, projection light that passes through the exit pupil P of the projector 20 to project an image onto the screen 10 forms a projected image thereon, as shown in FIG. 4(b), and projection light rays are subjected to efficient retroreflection at individual positions on the screen 10, entering a pupil E of a viewer positioned near the exit pupil P of the projector 20, so that bright projected images are viewable. In this case, there is not light corresponding to the above light rays e and f'. In addition, it is possible to achieve an efficient reflection type optical screen without application of reflective films such as metallic reflective layers on the conical reflecting facets 2 and 3 on the back side of the reflexive optical screen 10.

Figure 5A:
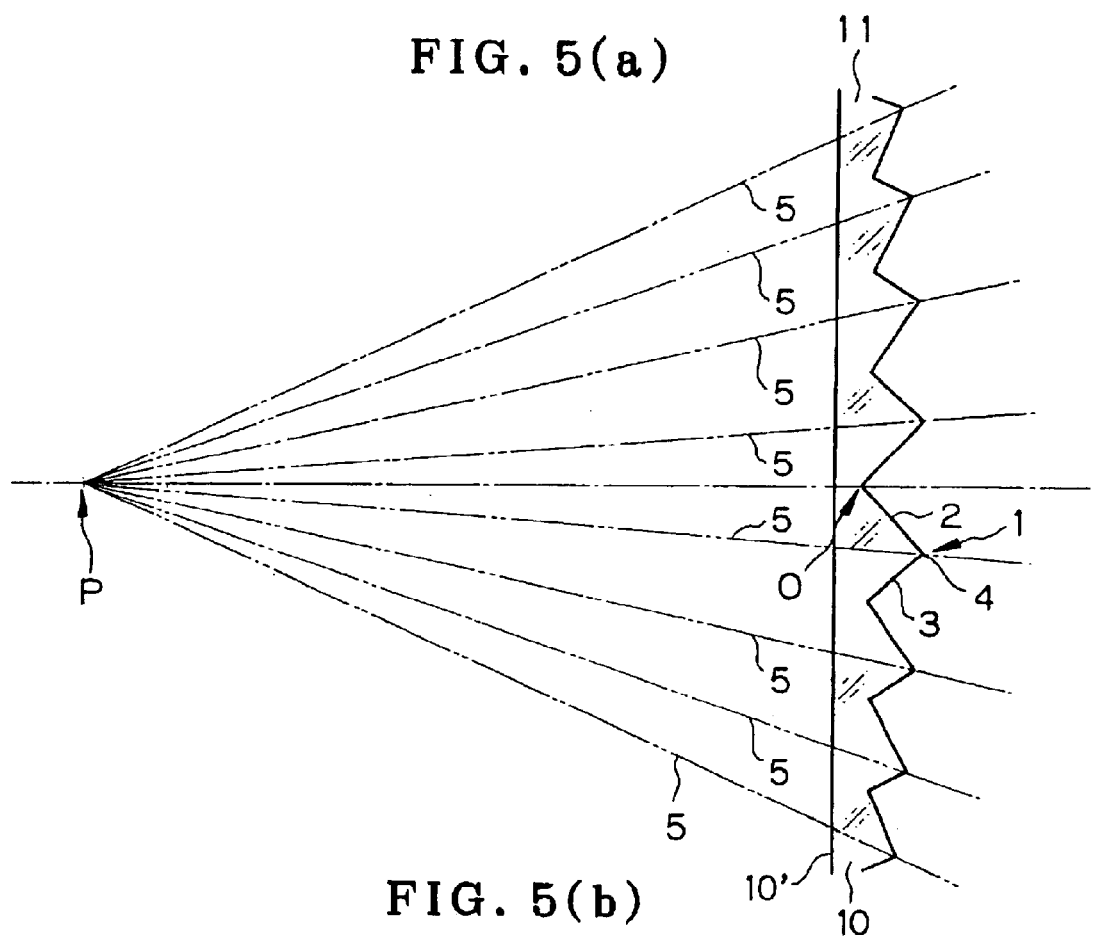
FIGS. 5($a$) and 5($b$) are illustrative of the construction and advantage of the reflexive optical screen according to the second embodiment of the invention.

According to a reflexive optical screen 10 of the inventive second embodiment wherein the first embodiment is modified into a planar form, it is again possible to achieve an efficient reflection type optical screen without application of reflective films such as metallic reflective layers on conical reflecting facets 2 and 3 on the back side of the reflexive optical screen 10. As shown in FIG. 5(a), the reflexive optical screen 10 is configured in a planar form, and zonal V-grooved reflecting surfaces 1, 1, . . . are located concentrically with respect to the center O of the screen 10 such that in a section orthogonal to a ridgeline 4 defined by a set of conical reflecting facets 2 and 3, a bisector 5 for an angle that the set of conical reflecting facets 2 and 3 make is oriented at any position toward the vicinity of the exit pupil P of the projector.

Figure 5B:
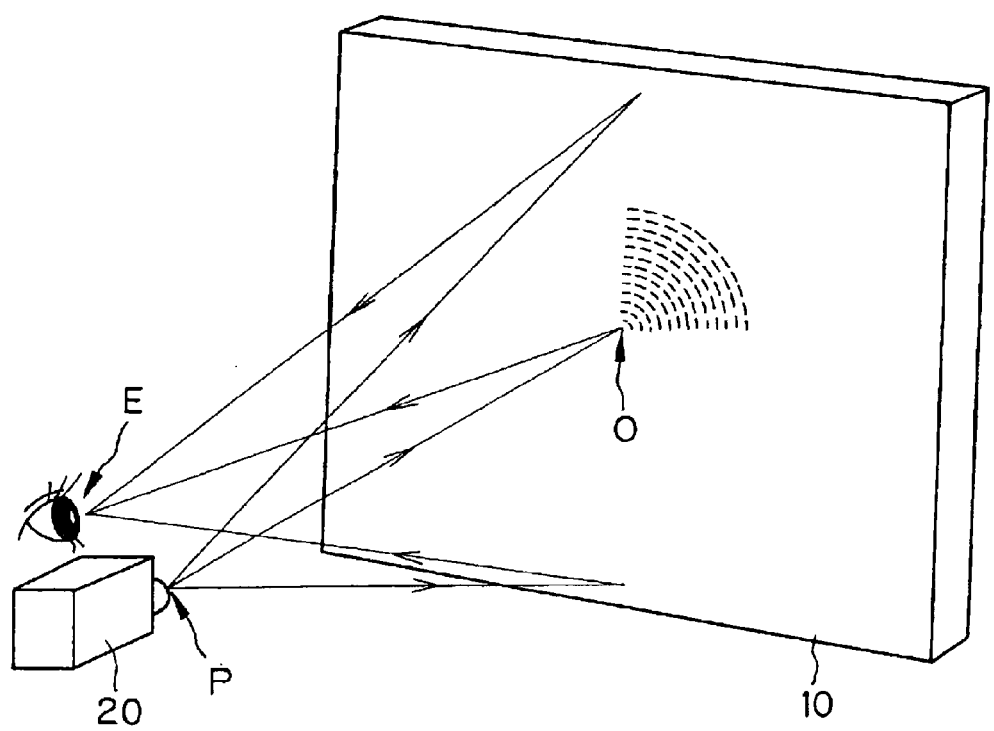

With the reflexive optical screen 10 set up as described above, projection light that passes through the exit pupil P of the projector 20 to project an image onto the screen 10 forms a projected image thereon, as shown in FIG. 5(b), and projection light rays are subjected to efficient retroreflection at individual positions on the screen 10, entering a pupil E of a viewer positioned near the exit pupil P of the projector 20, so that bright projected images are viewable. In this case, there is not light corresponding to the above light rays e and f'. In addition, it is possible to achieve an efficient reflection type optical screen without application of reflective films such as metallic reflective layers on the conical reflecting facets 2 and 3 on the back side of the reflexive optical screen 10.

Figure 6A:
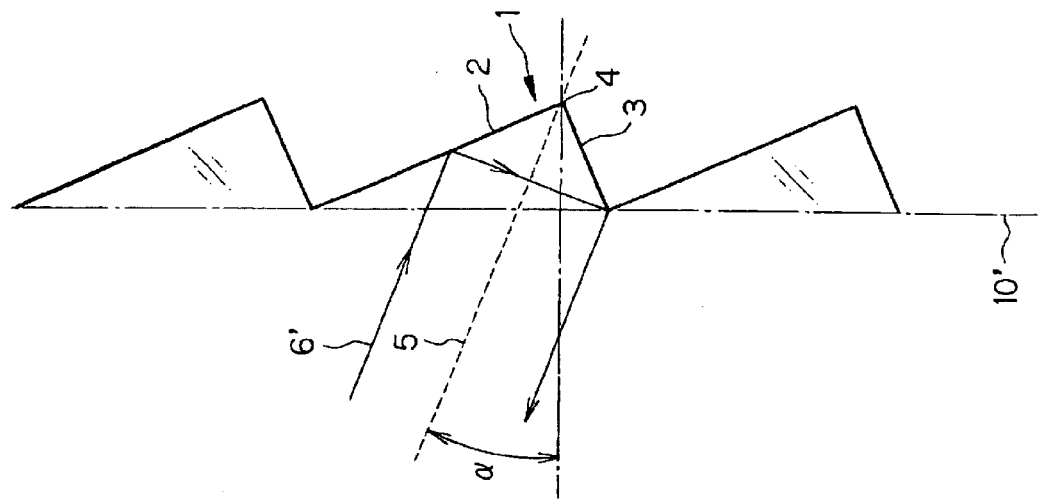
FIGS. 6($a$), 6($b$) and 6($c$) are sectional views orthogonal to the ridgeline of the zonal V-grooved reflecting surface, in which the bisector for the angles that two conical reflecting facets of the reflexive optical screen make is oriented in different directions.
Figure 6B:
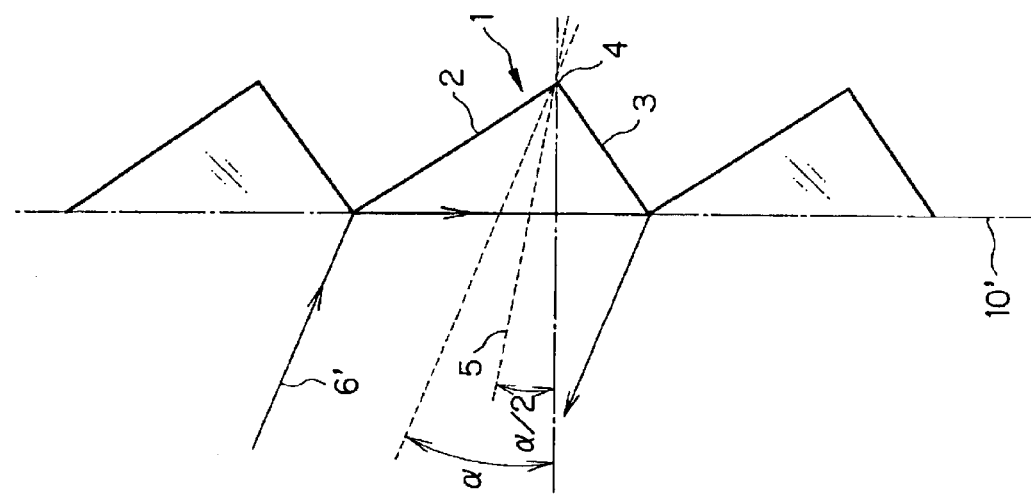
Figure 6C:
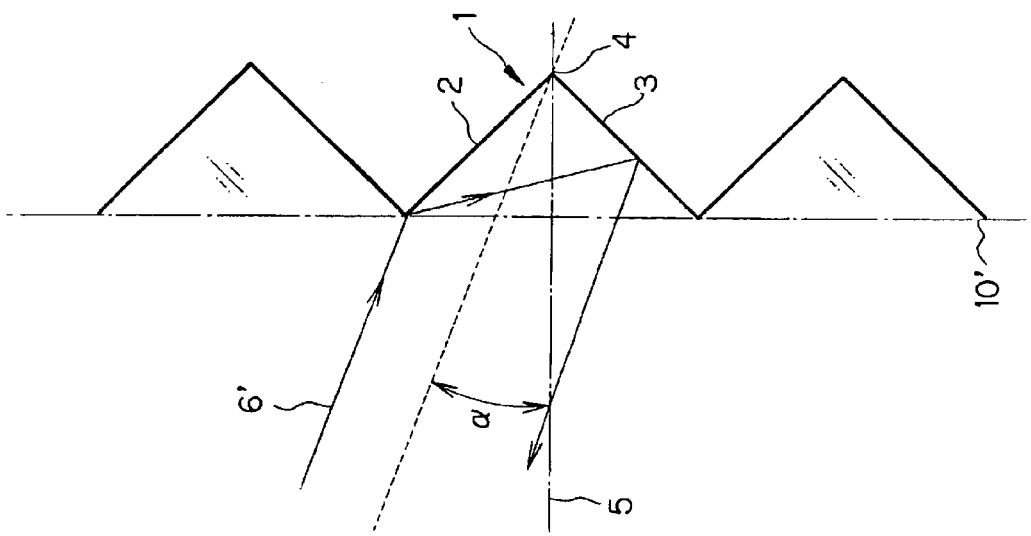

A reflexive optical screen 10 according to the inventive third embodiment is now explained. As explained with reference to FIG. 3, the light beam 6 incident on the plane 10' of the screen 10 at an angle α with respect to a normal thereto includes a component e that is reflected in a separate direction without undergoing retroreflection. A possible reason could be that light is reflected at one of the conical reflecting facets 2 and 3 of the zonal V-grooved reflecting surface 1 at an angle with respect to the screen plane 10' rather than parallel therewith. This is now explained with reference to FIGS. 6(*a*), 6(*b*) and 6(*c*) that are sectional views of a planar form of screen 10' surface of a reflexive optical screen 10, as viewed in a direction orthogonal to a ridgeline 4 of a zonal V-grooved reflecting surface 1. Throughout FIGS. 6(*a*), 6(*b*) and 6(*c*), a light ray 6' is incident on the screen 10 at an angle α with respect to a normal to the screen plane 10' (at an angle of incidence α). FIG. 6(*a*) shows that a bisector 5 for an angle that conical reflecting facets 2 and 3 make is vertical to the screen plane 10', as in FIG. 1, FIG. 6(*b*) shows that the bisector 5 is at an angle of 2/α with respect to the normal to the screen plane 10' (i.e., the angle of incidence is 2/α), and FIG. 6(*c*) shows that the bisector 5 is in the direction of the incoming light ray 6' (i.e., the angle of incidence is α), as in FIG. 5. From simple geometry, it could be appreciated that in FIG. 6(*a*), light reflected at the conical reflecting facet 2 goes deep toward the conical reflecting facet 3, whereat it is reflected; in FIG. 6(*b*), light reflected at the conical reflecting facet 2 goes along the screen plane 10' toward the conical reflecting facet 3, whereat it is reflected; and in FIG. 6(*c*), light reflected at a deep point of the conical reflecting surface 2 goes toward the screen plane 10', and is reflected at the conical reflecting facet 3.

Figure 7A:
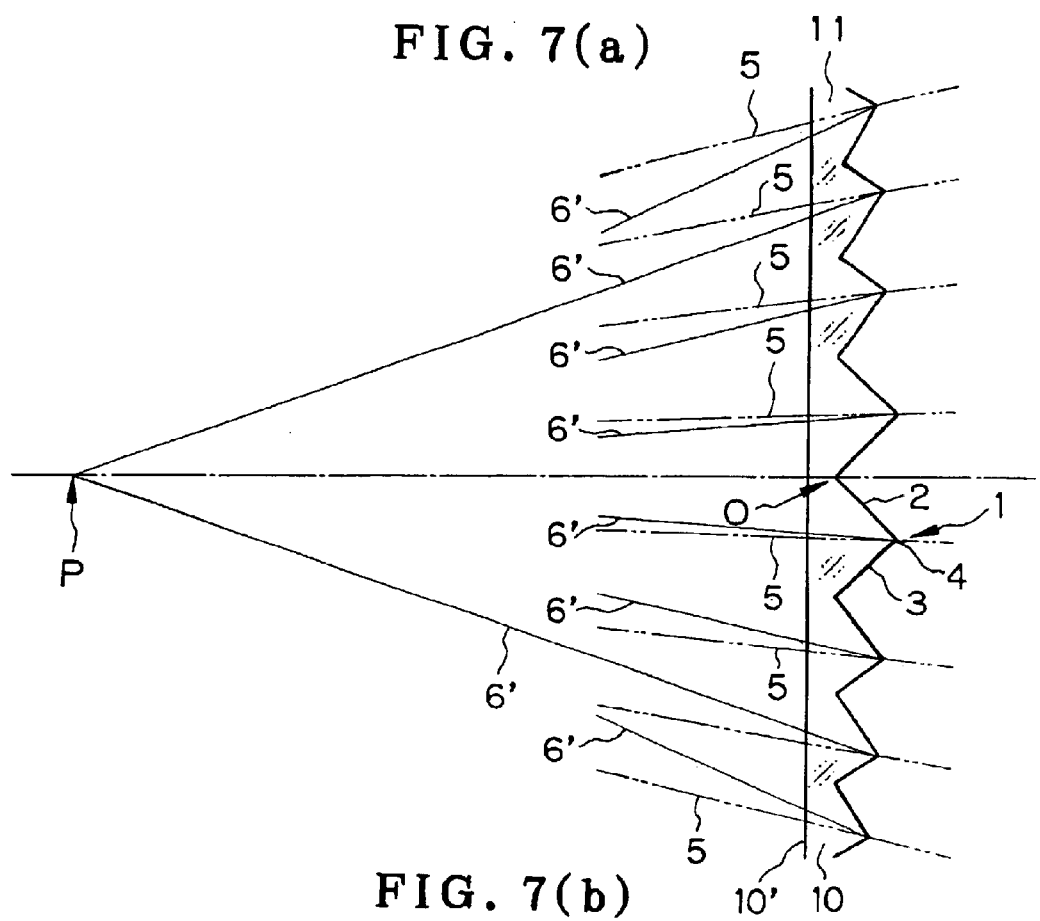
FIGS. 7($a$) and 7($b$) are illustrative of the construction and advantage of the reflexive optical screen according to the third embodiment of the invention.
Figure 7B:
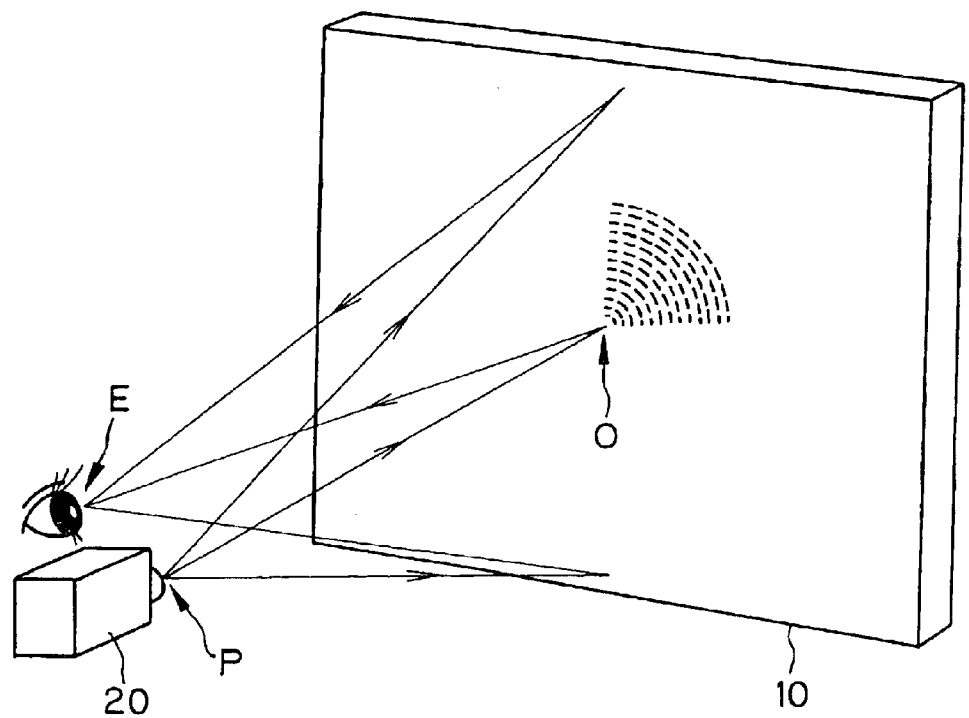

Obviously, this indicates that the arrangement of FIG. 6(*b*) ensures the elimination of any component that is reflected in separate directions without undergoing retroreflection, and insofar as light is reflected at the conical reflecting facets 2 and 3, efficiency reaches a high. To hald back the occurrence of a component that is not subjected to retroreflection upon incidence of light at an angle α with respect to the normal to the screen plane 10', it is thus desired that the bisector 5 for each of zonal V-grooved reflecting surfaces 1, 1, . . . that form the screen plane 10' be positioned at an angle α/2 with respect to the normal to the screen plane 10'. For the inventive third embodiment that satisfies this condition, it is important that, as shown in FIG. 7(*a*), a reflexive optical screen 10 be configured in a planar form, and in a section orthogonal to a ridgeline 4 defined by conical reflecting facets 2 and 3 that form together each of zonal V-grooved reflecting surfaces 1, 1, . . . located concentrically with respect to the center O of the screen 10, a bisector 5 for an angle that the conical reflecting facets 2 and 3 that make be oriented at every position on the screen 10 as follows. That is, the angles of the conical reflecting facets 2 and 3 that form together each zonal V-grooved reflecting surface 1 should be determined in such a way as to become ½ of α, where α is the angle of incidence of a light ray 6' on a given position on the screen 10.

With the reflexive optical screen constructed as described above, projection light that passes the exit pupil P of a projector 20 located on an axis passing through the center O of the screen 10 and vertical to the screen plane 10' to project an image thereon forms a projected image on the screen 10, as shown in FIG. 7(*b*), and projection light rays undergo efficient retroreflection at individual positions on the screen 10, entering the eye E of a viewer positioned near the exit pupil P of the projector 20, so that bright projected images are viewable. In this case, it is desired to provide reflective films such as metallic reflective layers on the back sides of the conical reflecting facets 2 and 3, because, in the peripheral site of the screen 10, light rays enter one of the conical reflecting facets 2 and 3 of each zonal V-grooved reflecting surface 1 at an angle of incidence smaller than the critical angle for the transparent substrate 11, resulting in an increase in the component that transmits through the transparent substrate 11 without undergoing retroreflection.

For the planar type reflexive optical screen 10 comprising a multiplicity of concentrically located zonal V-grooved reflecting surfaces 1, 1, . . . , as shown in FIG. 1, it is preferable to satisfy the following angular ratio:

$$0.1<\beta/\alpha<1.4 \tag{1}$$

Figure 8:
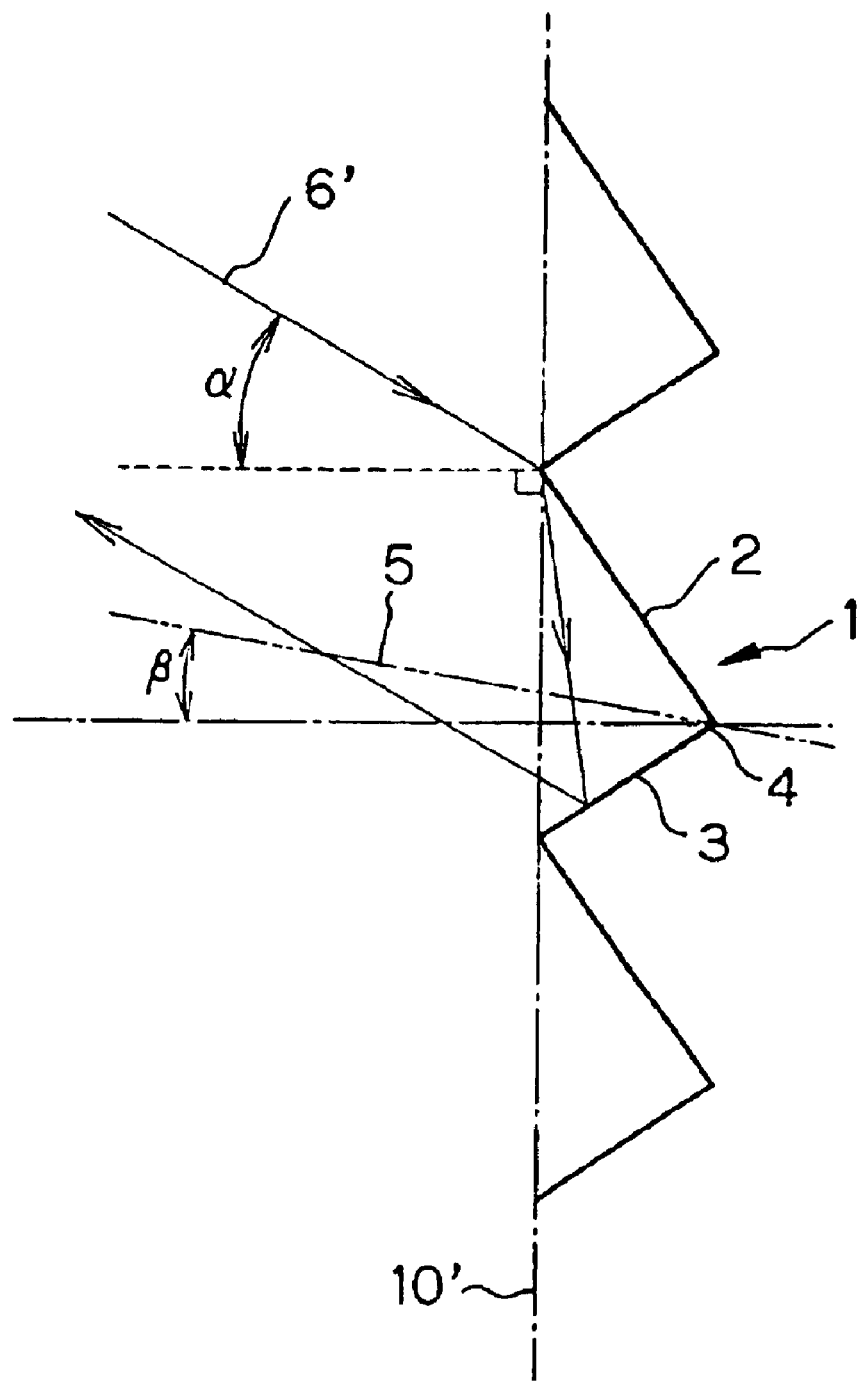
FIG. 8 is a view for studying relations between the angle of incidence $\alpha$ of incoming light rays with respect to the normal to the screen surface and the angle $\beta$ of the bisector for the angle that the conical reflecting facets make with respect to the normal to the screen surface.

Here, as shown in FIG. 8, α is the angle of incidence of an incoming light ray 6' with respect to a normal to a screen plane 10', and β is the angle of a bisector 5 with respect to the normal to the screen plane 10', said bisector being defined for an angle that conical reflecting facets 2 and 3 of each zonal V-grooved reflecting surface 1 make with respect to the normal to the screen plane 10'.

As the lower limit of 0.1 to condition (1) is not reached, light rays are considerably shaded at the conical reflecting facet 2 or 3 upon oblique incidence, resulting in inability to view projected images brightly. As the upper limit 2 is exceeded, the inclination of the bisector 5 becomes too large, leading now to overcorrection of such shadings and again resulting in inability to view bright images.

When reflective films such as metallic reflective layers are coated on the reflecting facets 2 and 3, it is preferable to satisfy the following condition.

$$0.1<\beta/\alpha<0.9 \tag{1-1}$$

Any deviation from the lower limit of 0.1 and the upper limit of 0.9 to this condition (1-1) renders it impossible to view bright images because of increased shadings at the reflecting facets 2 and 3.

When reflection at the reflecting facets 2 and 3 is total reflection, it is preferable to satisfy the following condition.

$$0.6<\beta/\alpha<1.4 \tag{1-2}$$

Any deviation from the upper and lower limits of 0.6 and 1.4 to condition (1-2) results in no total reflection, and so renders it impossible to view bright images.

It is not always required that the common center of the concentric reflecting surfaces be in alignment with the center of the screen; that common center could be out of alignment with or outside of the screen plane. The present invention includes such decentered arrangements.

Unless, in the embodiments of FIGS. 4, 5 and 7, the viewer's pupil E is brought near to the exit pupil P of the projector 20, it is impossible to view any bright image. In addition, the range of view where bright projected images are viewable is at most as narrow as the diameter of the exit pupil P of the projector 20, and any projected image is not viewable outside of that range. To solve two such problems, it is herein desired that a transmission hologram diffusing plate having an optical path-bending action plus light directivity/diffusibility be located in close contact with or near to the entrance side of the reflexive optical screen 10. Hereinafter, such a transmission hologram diffusing plate having an optical path-bending action plus light directivity/diffusibility will simply be called the hologram diffusing plate.

Figure 9A:
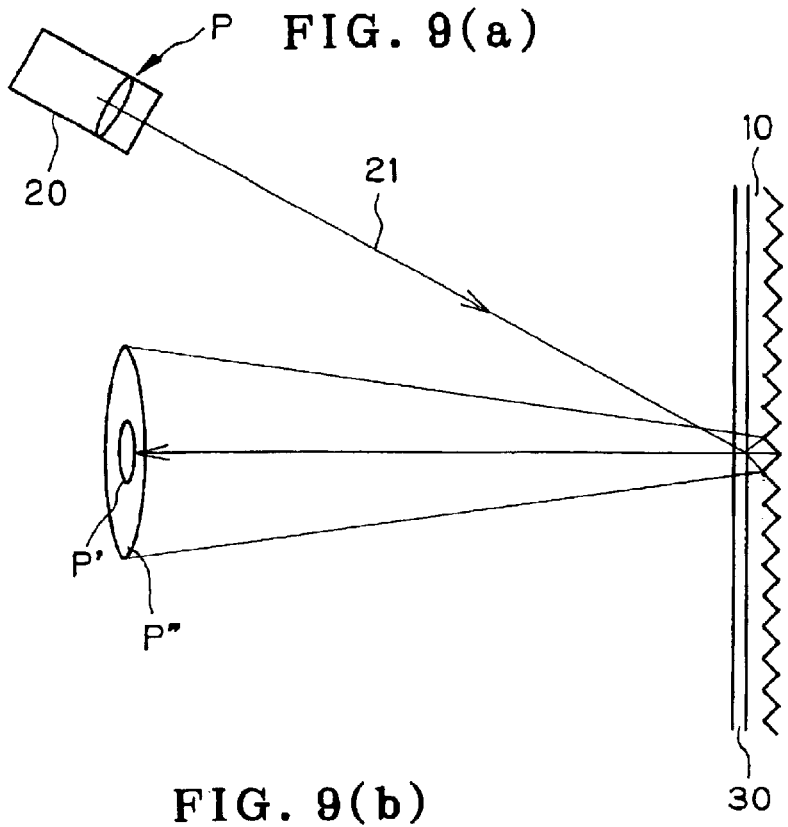
FIGS. 9($a$) and 9($b$) are illustrative of the action of a hologram diffusing plate located on the entrance side of the reflexive optical screen according to the invention.
Figure 9B:
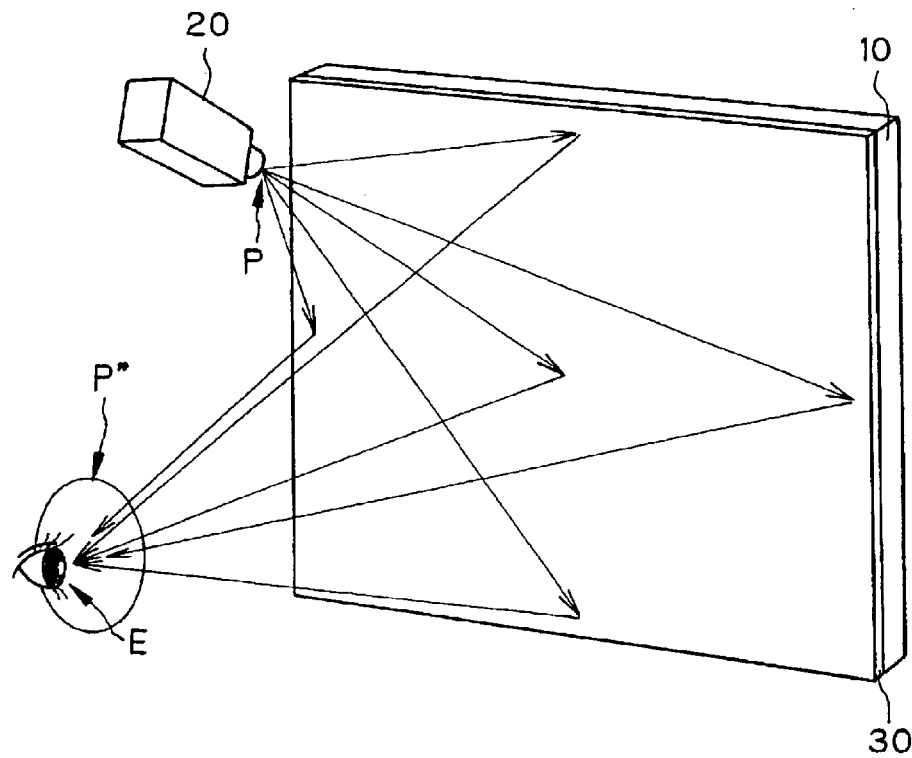

As shown in FIG. 9(*a*), a hologram diffusing plate 30 is located on the entrance side of a reflexive optical screen 10 constructed according to the invention. FIG. 9(*a*) is illustrative in conception of how the hologram diffusing plate 30 acts when projection light is projected from a projector 20 onto the screen 10. When there is no hologram diffusing plate 30, projection light 21 (with only a center ray shown) leaving the exit pupil P of a projector 20 located at an obliquely upper position goes back to the position of that exit pupil P by the retro-reflection action of the screen 10.

When the hologram diffusing plate 30 is provided, however, that projection light is reflected by its optical path-bending action into a pupil P' positioned at the front of the screen 10 and having the same size as the exit pupil P. It is here to be noted that since the hologram diffusing plate 30 has light directivity plus diffusibility, the bent reflected light is actually reflected into a magnified pupil P''' that is larger than the pupil P' and includes the range of the pupil P', so that even when the position of the viewer's pupil E is more or less out of alignment with the position of the pupil P', projected images are viewable so long as it falls within the range of the magnified pupil P'''. It is thus possible to achieve an easy-to-view viewing system.

Here, since the hologram diffusing plate 30 is located on the entrance side of the reflexive optical screen 10, light rays from the exit pupil P of the projector 20 to the magnified pupil P''' make a total of two round trips through the hologram diffusing plate 30. This may possibly cause light to be diffracted twice through the hologram diffusing plate 30. However, if the angle of the first transmission (before incidence on the screen 10) of light through the hologram diffusing plate 30 is intentionally different from the angle of the second transmission (after incidence on and retroreflection at the screen 10) of light through the hologram diffusing plate 30 (this is achieved by placing the projector 20 and the viewer's pupil E at different positions as herein contemplated), the diffraction of light upon either one of the first and the second transmission is then avoided to allow light to transmit straightforward through the hologram diffusing plate.

Figure 10A:
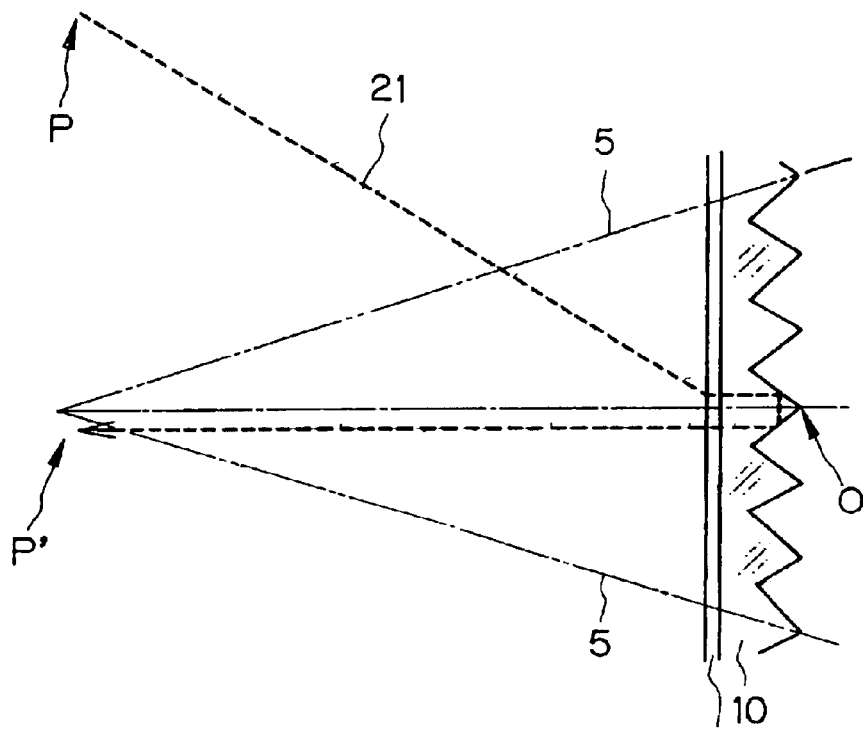
FIGS. 10($a$) and 10($b$) are optical path diagrams for the case where the hologram diffusing plate is constructed such that light is diffracted only upon the first or second transmission.
Figure 10B:
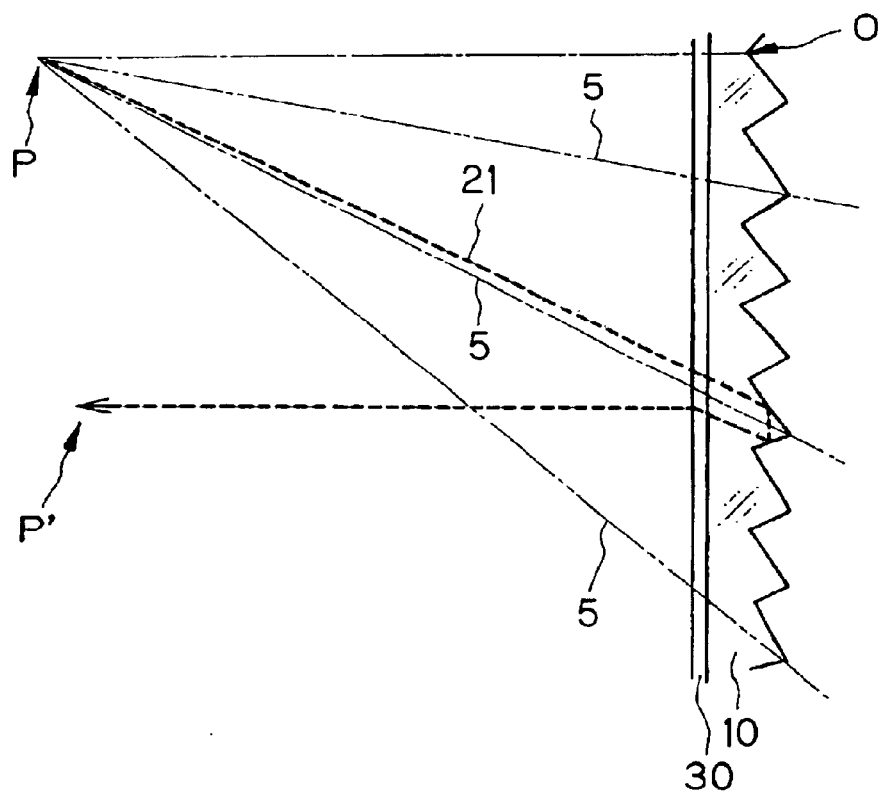

FIG. 10($a$) is a schematic optical path diagram for projection light 21 (with only a center ray shown) in the case where a hologram diffusing plate 30 is constructed such that diffraction occurs only upon the first transmission, and FIG. 10($b$) is a schematic optical path diagram for projection light 21 (with only a center ray shown) in the case where a hologram diffusing plate 30 is constructed such that diffraction occurs only upon the second transmission. Referring to FIG. 10($a$), the projection light 21 from the exit pupil P of a projection 20 located at an obliquely upper position passes through the hologram diffusing plate 30. The transmitted light is then diffracted in the direction of light rays coming from a pupil P' positioned at the front of the center O of a screen 10, whereat it is subjected to retroreflection. The reflected light now transmits through the hologram diffusing plate 30 without undergoing diffraction, entering a pupil P' (actually a magnified pupil P''' due to the diffusibility of the hologram diffusing plate 30). Referring then to FIG. 10($b$), projection light 21 from the exit pupil P of a projector 20 located at the front of the center O of a screen 10 and at an obliquely upper position with respect to the screen 10 first transmits through a hologram diffusing plate 30 without undergoing diffraction. The transmitted light rays are then subjected to retro-reflection, and the reflected light now passes through the hologram diffusing plate 30, whereby it is diffracted in a direction of incidence on a pupil P' that is out of the center O of the screen 10 and located at the front thereof, entering the pupil P' (actually a magnified pupil P''' due to the diffusibility of the hologram diffusing plate 30). Either one of the arrangements of FIGS. 10($a$) and 10($b$) ensures that the projection light 21 leaving the exit pupil P of the projector 20 located at an obliquely upper position with respect to the entrance side of the screen 10 is reflected toward the pupil P' positioned at the front of the screen 10, so that the exit pupil P of the projector 20 is separable from the pupil P' at which the viewer's pupil E is to be positioned.

Figure 11:
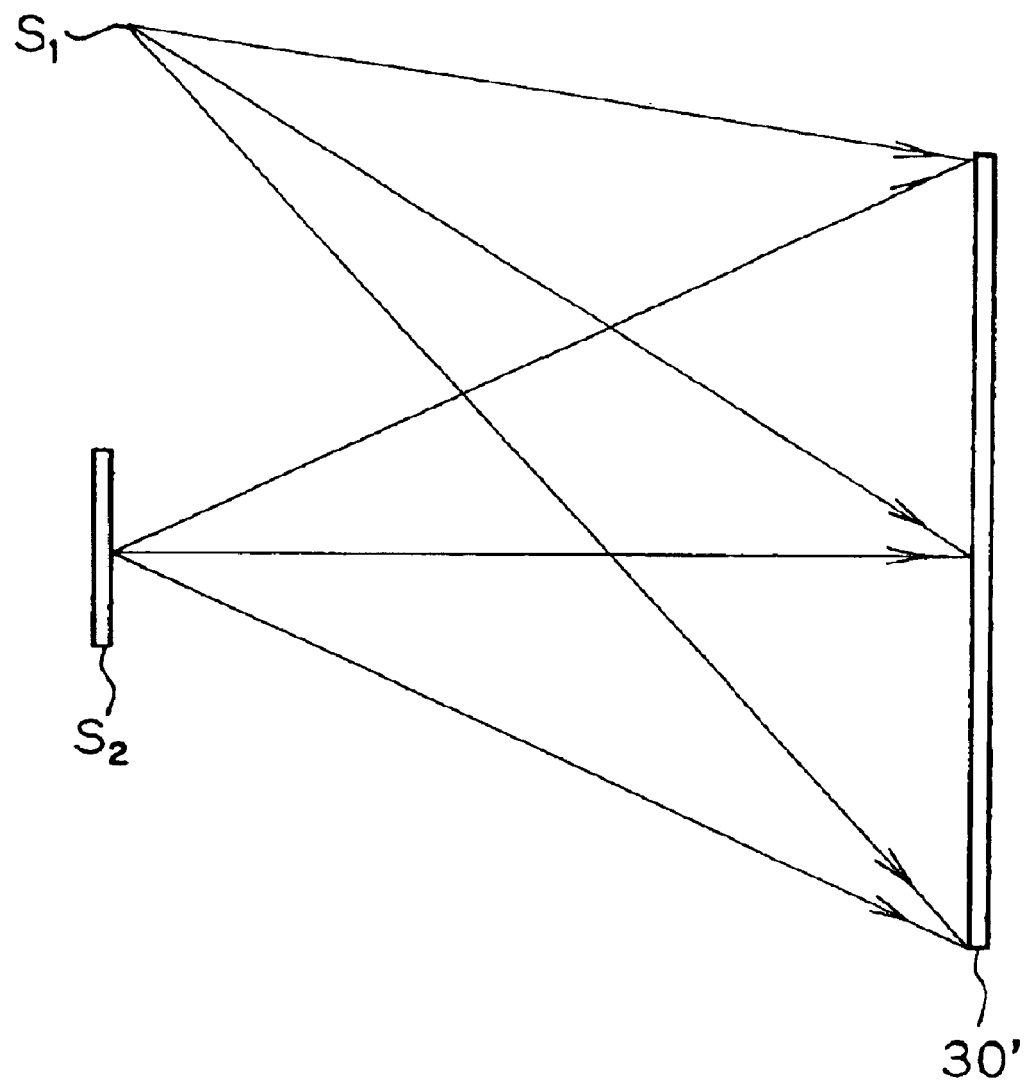
FIG. 11 is illustrative of an optical arrangement to fabricate a hologram diffusing plate.

To fabricate such a hologram diffusing plate 30 having an optical path-bending action and light directivity/diffusibility, a point light source $S_1$ is located at a relative position of the exit pupil P of the projector 20 with respect to a hologram photosensitive material 30' for the fabrication of the hologram diffusing plate 30, and a diffusing surface light source $S_2$ that is of substantially the same size as the magnified pupil P''' and coherent with the light source $S_1$ is located at a relative position of the pupil P', as shown in FIG. 11. Then, a given hologram is photo-recorded in the hologram photosensitive material 30' by interference therein of light from both light sources $S_{1\ and\ S2}$. To make the hologram diffusing plate 30 usable even with white light, it is preferable to use monochromatic light components of three colors R, G and B as the light from both light sources $S_1$ and $S_2$, so that the hologram photosensitive material can be exposed successively or concurrently to these light components for interference.

With the reflexive optical screen 10 constructed such that the bisector 5 for the angle that the conical reflecting facets 2 and 3 make is oriented toward the vicinity of the exit pupil P of the projector as described above and shown in FIGS. 4 and 5 in particular, it is possible to achieve a reflection type optical screen that can show bright images through total reflection (100% reflection at an angle of incidence greater than the critical angle) without application of reflective films such as metallic reflective layers on the conical reflecting facets 2 and 3 of V shape in section, formed on the back side of the transparent substrate 11 that forms the screen. In that case, if the total reflection condition for the conical reflecting facets 2 and 3 can be placed off balance, the reflection type optical screen can then be switched over to a transparent plate that makes the back side of the screen visible or a reflexive optical screen. Some specific embodiments for this are now explained, taking FIG. 5 as an example.

FIGS. 12 and 13 are sectional views through the center O of a reflexive optical screen 10. More specifically, FIG. 12($a$) or 13($a$) shows that the conical reflecting facets 2 and 3 act as total-reflection facets so that the screen 10 can work as a reflexive optical screen, and FIG. 12($b$) or 13($b$) shows that the total-reflection condition for the conical reflecting facets 2 and 3 is placed off balance so that the screen 10 can work as a transparent plate. Regarding the conical reflecting facets 2 and 3 of V shape in section, provided on the back side of the transparent substrate 11, their angles with respect to the screen plane are variable with position within the screen plane; for the sake of simplicity, however, those conical reflecting facets are shown to be at the same angle in FIGS. 12 and 13.

Referring to FIGS. 12($a$) and 12($b$), a transparent plate 40 is spaced away from the conical reflecting facets 2 and 3 of V shape in section, provided on the back side of the transparent substrate 11 that forms the reflexive reflecting screen 10, with a spacing 42 between them. The transparent plate 40 is formed of a transparent substrate 41 having substantially the same refractive index as the transparent substrate 11, and has a planar back surface and a front surface comprising a multiplicity of facets 2' and 3' that are of V shape in section and complementary in configuration with the conical reflecting facets 2 and 3.

Referring to FIGS. 13($a$) and 13($b$), a transparent plate 44 having substantially the same refractive index as the transparent substrate 11 that forms the reflexive optical screen 10 is spaced away from the conical reflecting facets 2 and 3 of V shape in section, provided on the back side of the transparent substrate 11, with a spacing 45 between them.

In either case, with the spacing 42 or 45 between the reflexive optical screen 10 and the transparent plate 40 or 44 is filled with air as shown in FIG. 12($a$) or 13($a$), the conical reflecting facets 2 and 3 act as total-reflection facets; they work as retroreflection facets, so that, as indicated by an arrow, incoming light can be subjected to retroreflection. Thus, this assembly can be used as a reflexive optical screen. Referring to FIGS. 12(b) or 13(b), on the other hand, the spacing 42 or 45 between the reflexive optical screen 10 and the transparent plate 40 or 44 is filled with a transparent liquid 43 having a refractive index equal to or slightly different from that of the transparent substrate 11, 41 or the transparent plate 44, say, an refractive index of at least 1.3. The conical reflecting facets 2 and 3 already lose their total-reflection function, and so incoming light shown indicated by an arrow transmits through the conical reflecting facets 2 and 3 (that no longer act as any reflecting facets) and then through the transparent liquid 43 and the transparent plate 40 or 44. In this case, the combined transparent substrate 11 and transparent plate 40 or 44 works as an ordinary transparent assembly.

Thus, if the filling or removal of the transparent liquid 43 in or from the spacing 42 or 45 is controlled, the assembly can then be switched over to a retro-reflection screen or a transparent plate. For instance, when the assembly is used with a widow glass, it works as a transparent glass in ordinary states, and as a retro-reflection screen only at the time of viewing images.

It is noted that when the transparent liquid 43 contains water, it is preferable to subject the conical reflecting facets 2 and 3 that face the spacing 42, 45 to water-repellent treatment, because upon removal of the transparent liquid 43, such facets can quickly revert to total-reflection facets. When the transparent liquid 43 contains oil, it is again preferable to subject the facets 2 and 3 to hydrophilic treatment for the same reason.

Figure 14:
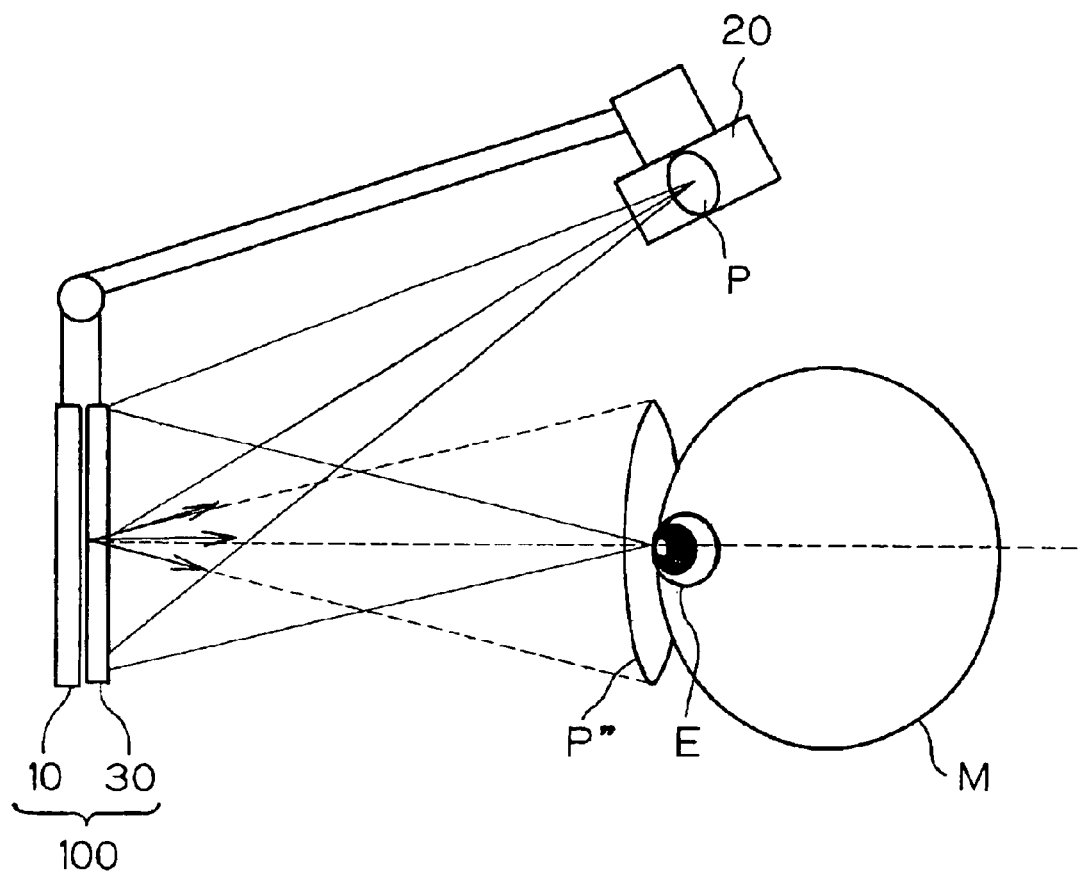
FIG. 14 is illustrative of one exemplary arrangement of a projection viewing system that incorporates the reflexive optical screen according to the invention.

The reflexive optical screen constructed according to the invention as described above may be used with a viewing system, as shown in FIG. 14. In this case, projection light from a display device built in a projector 20 for displaying images thereon or projection light from an intermediate image formed through an optical system is magnified and projected through a projection optical system built in the projector 20. In the instant embodiment, a projected image is formed in the vicinity of a screen 100 comprising a hologram diffusing plate 30 and a reflexive optical screen 10 according to the invention. Diffused and reflected light of directivity from the screen 100 is reflected into a magnified pupil P" located at the front of the screen, so that the projected image on the screen 100 is visible to the eye E of a viewer M positioned in the magnified pupil P". In this case, even when the eye E of the viewer M is more or less out of place, the projected image can be viewed so long as the viewer's eye is in the range of the magnified pupil P'. It is thus possible to obtain an easy-to-view viewing system.

Figure 15:
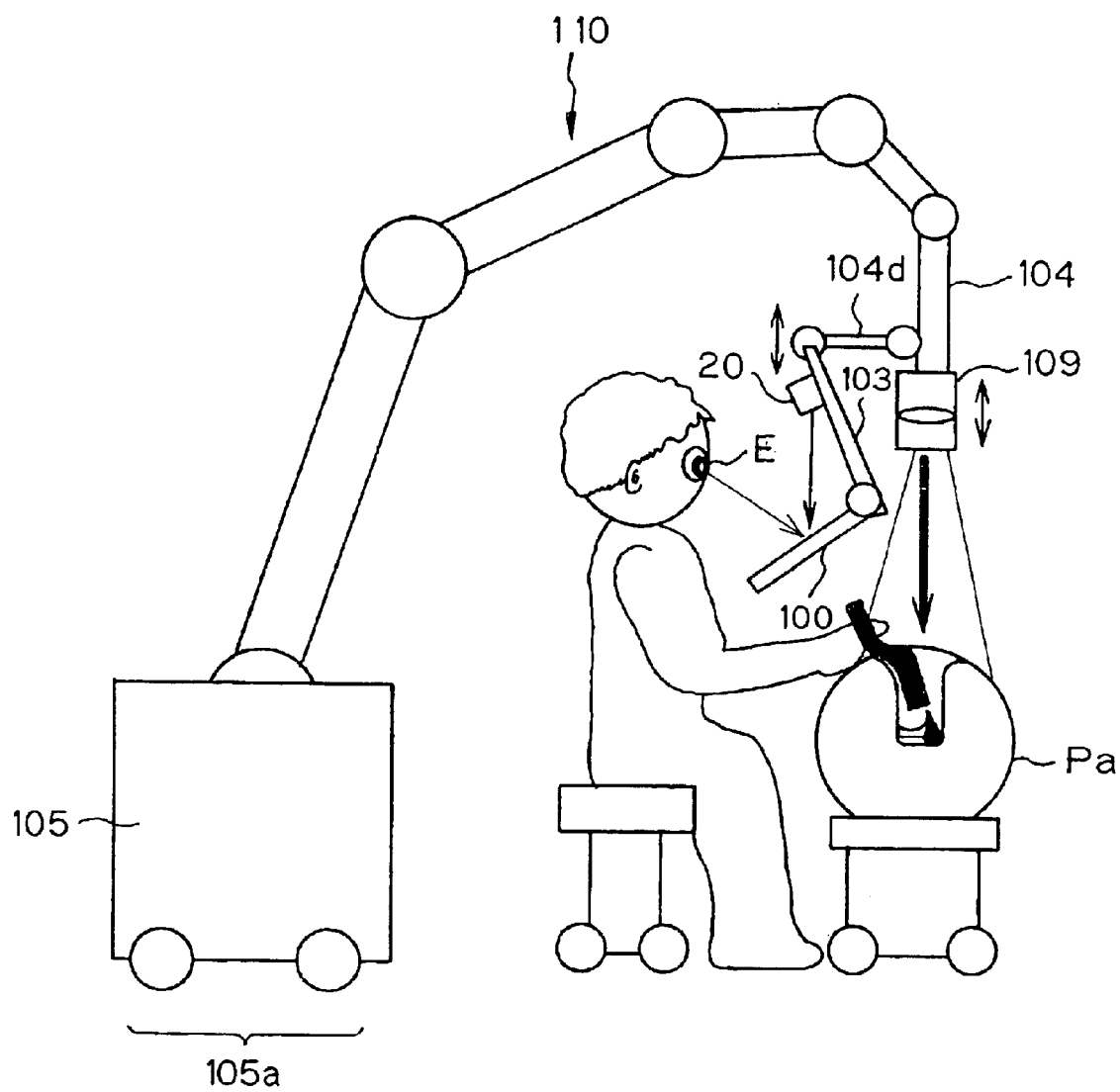
FIG. 15 is illustrative of one exemplary surgical 3D viewing system that incorporates the reflexive optical screen according to the invention.

Such a viewing system according to the invention, for instance, may be used with such a surgical 3D viewing system as shown in FIG. 15. FIG. 15 is illustrative of one embodiment of this surgical 3D viewing system, wherein a support body 105 having a caster 105a is connected with a universal arm 110, which is in turn connected with a support arm 104. Three-dimensionally movable and 360° rotatable, the support arm 104 is provided with a holder member 103 via a joint 104d. This holder member 103 that is also adapted to be movable and rotatable is provided with a projector 20 and a screen 100 according to the invention.

On the other hand, the support arm 104 is provided at its end with an image input device 109 in a surgical microscope. The image input device 109 has a built-in camera to take images of an affected part in a patient Pa. The images are sent as input images to a projection viewing system, more particularly, the projector 20.

The thus constructed FIG. 15 system ensures that while the images of the affected part in the patient Pa are viewed under the surgical microscope, operation can be performed.

Figure 16:
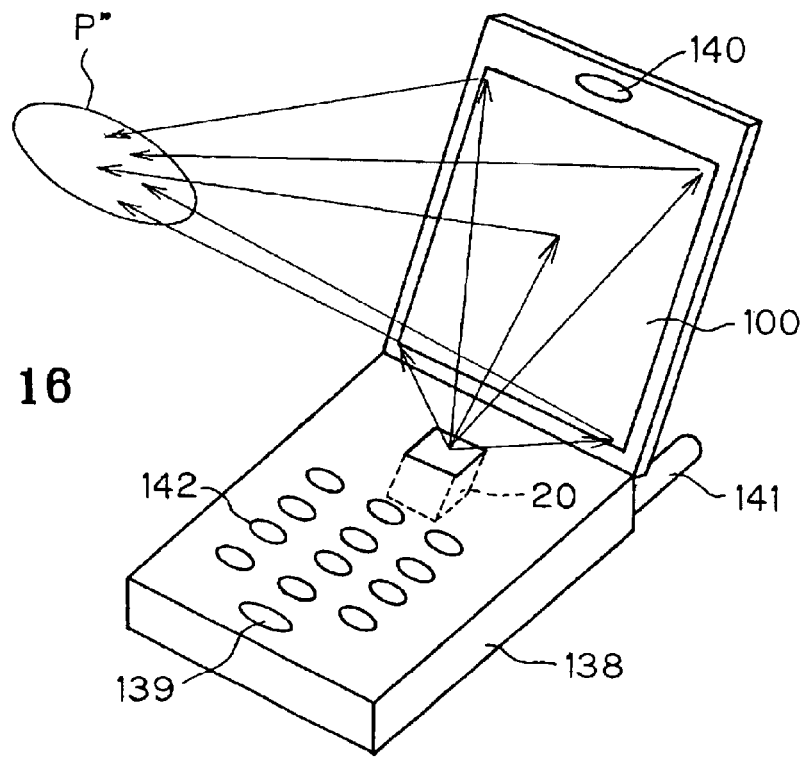
FIG. 16 is illustrative of a cellular phone embodied by the viewing system of the invention.
Figure 17:
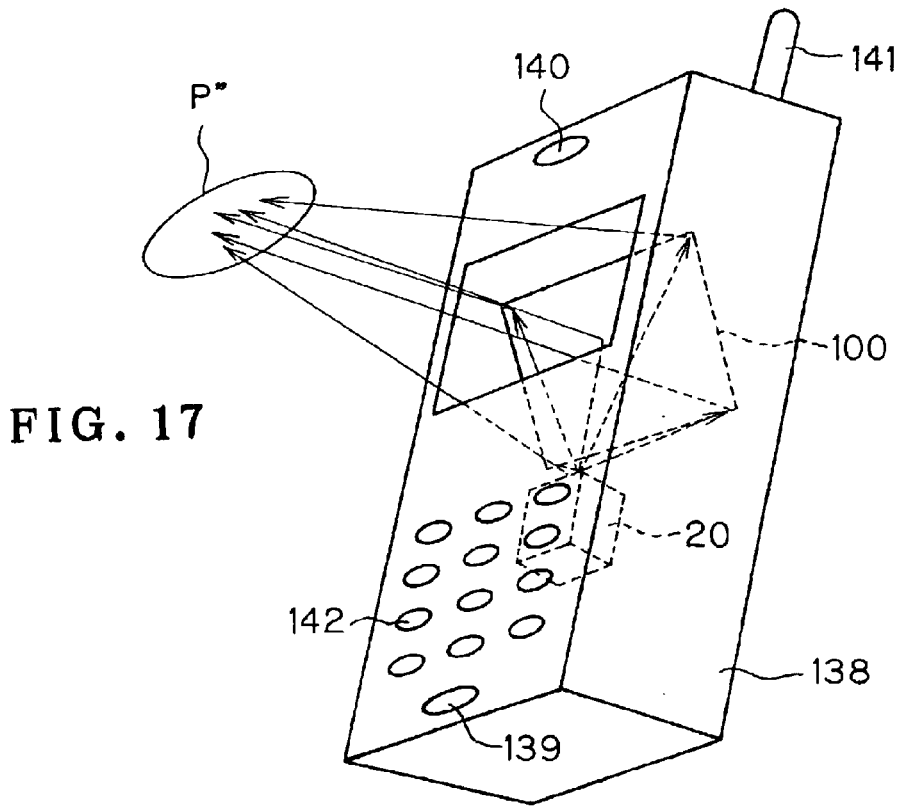
FIG. 17 is illustrative of another cellular phone embodied by the viewing system of the invention.

The projection viewing system according to the invention may also be used with information processors in general, and a convenient-to-carry cellular phone in particular. FIGS. 16 and 17 are illustrative of one embodiment of such a projection viewing system, in particular, a cellular phone.

The cellular phone indicated generally at 138 comprises a microphone 139, a speaker 140, an antenna 141, a button 142, and the projection viewing system according to the invention. The microphone 139 is to enter the voice of an operator as information, and the speaker 140 is to produce the voice of a person at the other end. The antenna 141 is to transmit and receive communications waves, and the button 142 is used for the operator to enter information in the cellular phone.

The projection viewing system according to the invention are used to project and display the images taken of the operator, a person at the other end, etc. as well as information such as telephone numbers. A projector 20 and a screen 100 according to the invention are so located that displayed images can be reasonably viewed at the position of a magnified exit pupil P".

An embodiment of FIG. 16 has a mechanism for folding a screen 100 up or down with respect to a cellular phone 138, so that the cellular phone can be placed in a pocket, etc. during carrying. In an embodiment of FIG. 17, a screen 100 is fixed within the body of a cellular phone 138, so that the cellular phone can be placed as such in a pocket, etc.

Figure 18:
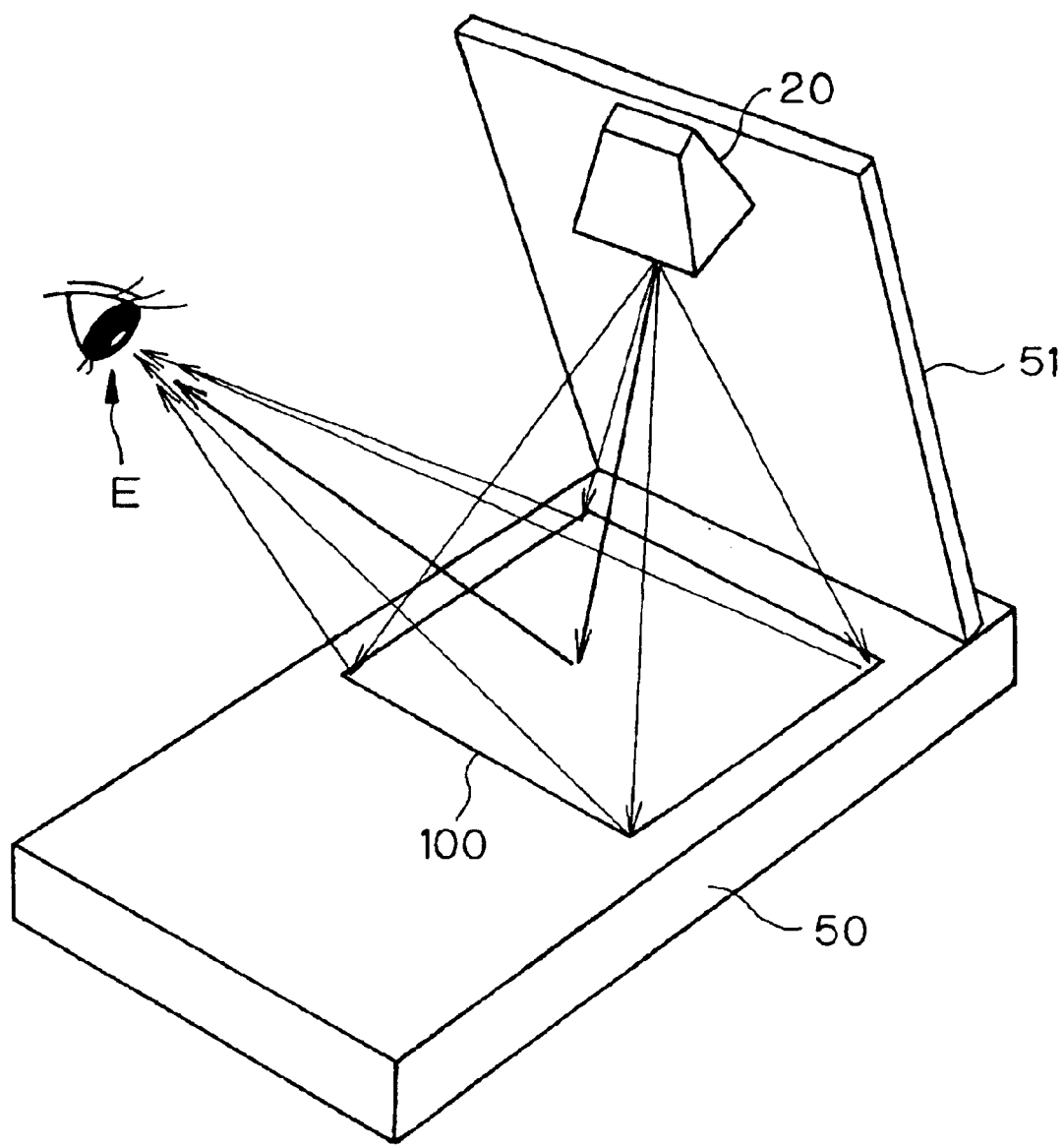
FIG. 18 is illustrative of one example of a hand-holdable viewer type embodied by the viewing system of the invention.

Further, the projection viewing system according to the invention may be applied to such a hand-holdable viewer type device as shown in FIG. 18, to say nothing of the above portable type device. For instance, a projector 20 could be foldably attached to the body of a projection viewing system such that a support member 51 of the projector 20 serves as a protective cover for a screen 100 according to the invention, thereby improving dustproof capability.

While the reflexive optical screen according to the invention and the viewing system incorporating the same have been described in conjunction with some embodiments, it is understood that the invention is by no means limited thereto and so many modifications could be made thereto.

What is claimed is:

1. A reflexive optical screen comprising a plurality of zonal V-grooved reflecting surfaces substantially concentrically located within a given surface and having a retroreflection action, wherein:

each of said zonal V-grooved reflecting surfaces comprises mutually orthogonal two conical facets in a section orthogonal to a ridgeline of a V groove, and the conical facets of each of said zonal V-grooved reflecting surfaces are located such that a bisector for angles that said two conical facets make in the section of each of said zonal V-grooved reflecting surfaces is oriented in a direction of a light ray incident on a position thereof.

2. The reflexive optical screen according to claim 1, wherein the two conical facets that form each of said zonal V-grooved reflecting surfaces are provided on a back side of a transparent substrate in a facet form of V shape in section.

3. The reflexive optical screen according to claim 2, wherein each of the surfaces of V shape in section, provided on the back side of said transparent substrate, is defined by a total-reflection facet.

4. The reflexive optical screen according to claim 2, wherein each of the surfaces of V shape in section, provided on the back side of said transparent substrate, is provided with a reflective film.

5. The reflexive optical screen according to claim 1, wherein each of said conical facets is defined by a rotationally symmetric facet around an axis that passes through a center around which said plurality of zonal V-grooved reflecting surfaces are substantially concentrically located and is vertical to the screen surface.

6. The reflexive optical screen according to claim 1, wherein the screen surface comprises a spherical surface concave on a light-entrance side thereof, and the conical facets of each of said zonal V-grooved reflecting surfaces are formed on the spherical surface such that said bisector passes through a substantial center of said spherical surface.

7. The reflexive optical screen according to claim 1, wherein the screen surface comprises a planar surface, and the conical facets of each of said zonal V-grooved reflecting surfaces are formed on the planar surface such that said bisector for each of said zonal V-grooved reflecting surfaces is oriented in a direction of incidence of a light ray diverged from a finite distance position on an axis that is located on a light rayentrance side of the screen surface, passes through a center around which said plurality of zonal V-grooved reflecting surfaces are substantially concentrically located and is vertical to the screen surface.

8. The reflexive optical screen according to claim 7, wherein an optical element is located on the entrance side of said screen surface to change a direction of a light ray diverged from said vertical axis and finite distance.

9. The reflexive optical screen according to claim 1, wherein a hologram diffusing plate is located on an entrance side of the screen surface.

10. The reflexive optical screen according to claim 9, wherein said hologram diffusing plate comprises a hologram having an optical path-bending action and light 5 directivity/diffusibility.

11. The reflexive optical screen according to claim 3, wherein a transparent plate is located facing said conical facets provided on the back side of said transparent substrate in a facet form of V shape in section with a spacing therebetween, in or from which a transparent liquid is filled or removed.

12. The reflexive optical screen according to claim 11, wherein said transparent liquid has a refractive index of at least 1.3.

13. The reflexive optical screen according to claim 11, wherein said transparent liquid contains water, and said conical facets are subjected to water repellent treatment.

14. The reflexive optical screen according to claim 11, wherein said transparent liquid contains oil, and said conical facets are subjected to hydrophilic treatment.

15. A viewing system comprising an image display device, a projection optical system for magnifying and projecting an image displayed on said image display device, and an optical screen located at or near an image projected through said projection optical system, wherein:
    said optical screen comprises a reflexive optical screen as recited in claim 1.

16. A viewing system comprising an image display device, a projection optical system for magnifying and projecting an image displayed on said image display device, and an optical screen located near an image projected through said projection optical system, wherein:
    said screen is constructed as recited in claim 7, and positions of said screen and said projection optical system are determined such that a pupil of said projection optical system is positioned at said finite distance.

17. A reflexive optical screen comprising a plurality of zonal V-grooved reflecting surfaces substantially concentrically located within a given surface and having a retroreletion action, wherein:
    each of said zonal V-grooved reflecting surfaces comprises mutually orthogonal two conical facets in a section orthogonal to a ridgeline of a V groove, and the conical facets of each of said zonal V-grooved reflecting surfaces are located such that an angle of entrance on a screen surface of a bisector for an angle that said two conical facets make in said section becomes a/2 where (x is an angle of incidence of a light ray on each of said zonal V-grooved reflecting surfaces relative to the screen surface.

18. The reflexive optical screen according to claim 17, wherein the screen surface comprises a planar surface, and said angle of incidence (x is determined with respect to light diverged from a finite distance position on an axis that is located on a light ray-entrance side of the screen surface, passes through a center around which said plurality of zonal V-grooved reflecting surfaces are substantially concentrically located and is vertical to the screen surface.

19. A reflexive optical screen comprising a plurality of zonal V-grooved reflecting surfaces substantially concentrically located within a given surface and having a retroreletion action, wherein:
    each of said zonal V-grooved reflecting surfaces comprises mutually orthogonal conical facets in a section orthogonal to a ridgeline of a V groove, and
    said reflexive optical screen satisfies condition (1-1)

$$0.1 < \beta/\alpha < 0.9 \tag{1-1}$$

where (x is an angle of incidence of a light ray radiated from a finite distance point and incident on a screen surface portion of each of said zonal V-grooved reflecting surfaces, and 0 is an angle of a bisector for an angle that said two conical facets make in said section with respect to a screen surface.

* * * * *

UNITED STATES PATENT AND TRADEMARK OFFICE
CERTIFICATE OF CORRECTION

PATENT NO.        : 6,963,224 B2
APPLICATION NO. : 10/913466
DATED             : November 8, 2005
INVENTOR(S)      : Takayoshi Togino It is certified that error appears in the above-identified patent and that said Letters Patent is hereby corrected as shown below:

Item 57, line 6, replace "retrorelection" with -- retroreflection --
Column 1, line 38, replace "retroelection" with -- retroreflection --
Column 10, line 49, replace "retroelection" with -- retroreflection --
Column 12, line 17, replace "retroelection" with -- retroreflection --
Column 12, line 39, replace "retroelection" with -- retroreflection --
Column 11, line 24, replace "light rayentrance" with -- light ray-entrance --.

Signed and Sealed this

Eighteenth Day of July, 2006

JON W. DUDAS
*Director of the United States Patent and Trademark Office*